(12) United States Patent
Cunha et al.

(10) Patent No.: US 11,928,278 B2
(45) Date of Patent: Mar. 12, 2024

(54) SYSTEM AND METHOD OF PREDICTING MULTI-FINGER FORCE IN TOUCH SCREENS USING ARTIFICIAL INTELLIGENCE

(71) Applicant: Robert Bosch GmbH, Stuttgart (DE)

(72) Inventors: Carlos Cunha, Menlo Park, CA (US); Ingo Hermanns, Hildesheim (DE)

(73) Assignee: Robert Bosch GmbH (DE)

( * ) Notice: Subject to any disclaimer, the term of this patent is extended or adjusted under 35 U.S.C. 154(b) by 214 days.

(21) Appl. No.: 17/186,713

(22) Filed: Feb. 26, 2021

(65) Prior Publication Data
US 2022/0276737 A1 Sep. 1, 2022

(51) Int. Cl.
*G06F 3/041* (2006.01)
*G06F 30/27* (2020.01)
*G06N 3/08* (2023.01)

(52) U.S. Cl.
CPC .......... *G06F 3/0414* (2013.01); *G06F 3/0416* (2013.01); *G06F 30/27* (2020.01); *G06N 3/08* (2013.01); *G06F 2203/04104* (2013.01)

(58) Field of Classification Search
None
See application file for complete search history.

(56) References Cited

U.S. PATENT DOCUMENTS

| 10,416,771 B2 | 9/2019 | Warren |
| 10,534,469 B2 | 1/2020 | Gui et al. |
| 2018/0074637 A1* | 3/2018 | Rosenberg .............. G06F 3/045 |
| 2021/0200501 A1* | 7/2021 | Stankoulov ........... G06F 3/1462 |

FOREIGN PATENT DOCUMENTS

| CN | 111061394 A | 4/2020 |
| EP | 2241955 A1 | 10/2010 |

* cited by examiner

*Primary Examiner* — Stephen T. Reed
(74) *Attorney, Agent, or Firm* — Dickinson Wright PLLC

(57) ABSTRACT

An electronic device includes a user input surface configured to receive a user touch location and a user force input, one or more sensors positioned relative to the user input surface and configured to detect a force applied to the user input surface, and a controller in communication with the one or more sensors. The controller is configured to detect a first sensor response utilizing a first force applied to the user input surface via the one or more sensors and a first position of the first force applied, wherein the first position is relative to the user input surface, simulate a multi-finger force being applied by utilizing at least the first sensor response to form simulated multi-finger data, and deploy a model associated with the multi-finger force, wherein the model is utilized to output a predicted force and predicted location of an applied force relative to the input surface.

20 Claims, 5 Drawing Sheets

SYSTEM AND METHOD OF PREDICTING MULTI-FINGER FORCE IN TOUCH SCREENS USING ARTIFICIAL INTELLIGENCE

TECHNICAL FIELD

The present disclosure relates to touch screen devices, including how to calculate force upon a touch screen device.

BACKGROUND

Various devices may include single finger force recognition, such as those found in MacBooks, are already available, which may be referred to as Apple 3D Touch. Google has also just released something called Firm Touch, which may rely solely on the direct response of the screen to finger conductivity. Lastly, Apple's GarageBand software, seems to have come with a force sensitivity relying in accelerometers. These technologies work with limited accuracy for thin (and small) displays. For large, thick displays, often including an air gap between the touching surface and the electronics, 3D Touch and Firm Touch become prohibitively expensive or inaccurate.

SUMMARY

According to one embodiment, an electronic device includes a user input surface configured to receive a user touch location and a user force input, one or more sensors positioned relative to the user input surface and configured to detect a force applied to the user input surface, and a controller in communication with the one or more sensors. The controller is configured to detect a first sensor response utilizing a first force applied to the user input surface via the one or more sensors and a first position of the first force applied, wherein the first position is relative to the user input surface, simulate a multi-finger force being applied by utilizing at least the first sensor response to form simulated multi-finger data, and deploy a model associated with the multi-finger force, wherein the model is utilized to output a predicted force and predicted location of an applied force relative to the user input surface.

According to another embodiment, an electronic device includes a controller in communication with one or more sensors positioned relative to a user input surface and configured to detect a force applied to the user input surface via a user touch location and a user force input. The controller is configured to detect a first sensor response in response to a first force being applied to the user input surface via the one or more sensors, simulate a multi-finger force being applied by utilizing at least the first sensor response to form simulated multi-finger data, and deploy a model associated with the multi-finger force, wherein the model is utilized to output a predicted force and predicted location of an applied force relative to the user input surface.

According to a third embodiment, a method for predicting multi-finger force in a touch screen, including receiving a user touch location and a user force input via a user input surface, detecting a first force applied to the user input surface utilizing one or more sensors positioned relative to the user input surface, detecting a first sensor response utilizing the first force applied to the user input surface via the one or more sensors, simulating a multi-finger force being applied by utilizing at least the first sensor response to form simulated multi-finger data, and deploying a model associated with the multi-finger force, wherein the model is utilized to output a predicted force response associated with a predicted force and predicted location of a future applied force to the user input surface.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modern touch screens can improve user experience by triggering functionality based not only on the position at which a finger touches the screen, but also on the force with which the screen is pressed. Such functionality is already in deployment in laptop touchpads (Apple touchpads) and even smart phones (iPhone, Google Pixel 4). As touch screens get larger, e.g. in Automobile displays, it is important to develop capabilities to allow for multiple users to simultaneously use the same touch screen. In this context, simultaneously detecting the force applied by multiple fingers is a timely and useful invention.

The essence of the invention lies in the set of methods used for estimating the forces as function of the sensor responses given that we can only observe the inverse relationship, that is, the responses as a function of the finger forces. The invention considers errors and their covariances at multiple steps in the measurement process and is highly generalizable to different screen/sensor designs. The invention is more powerful than pure physics-based modelling (including Plate Theory) in that the properties of the touch screen are determined by measured data, without a priori need for simplifying assumptions regarding contact surfaces, conductivity, homogeneity of surfaces, etc.

Figure 1A:
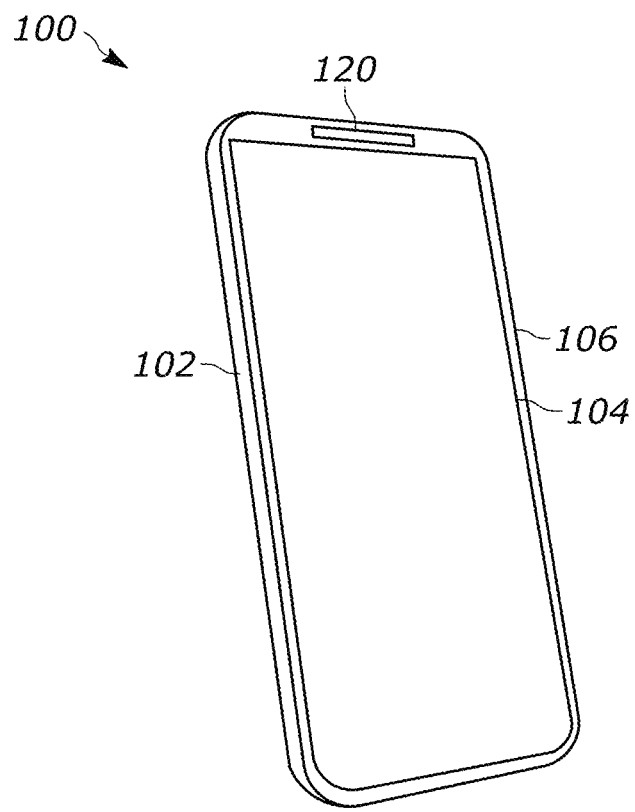
FIG. 1A discloses a front perspective view of an exemplary portable electronic device 100 in accordance with some embodiments are respectively illustrated.

Referring to FIG. 1A, a front perspective view of an exemplary portable electronic device 100 in accordance with some embodiments are respectively illustrated. Portable electronic device 100 can be a mobile communication device such as a smartphone and/or a tablet device. Portable electronic device 100 may vary in size and shape. In the embodiment shown in FIGS. 1A and 1B, portable electronic device 100 can take the form of a smartphone. While a portable electronic device is utilized as merely an example, any electronic device may be utilized, such as a vehicle multimedia system, television, computer monitor, laptop screen etc.

Portable electronic device 100 can include a side wall retainer 102 that can define the perimeter of portable electronic device 100. Side wall retainer 102 can provide structural support and protection to portable electronic device 100. Side wall retainer 102 can sometimes also be referred to as a frame or a band piece. Side wall retainer 102 can be formed from a high strength material such as stainless steel, aluminum, and/or an alloy that includes aluminum. However, other materials are also possible, such as a high strength plastic or ceramic. Portable electronic device 100 can also include, on a front surface, a display assembly 104 designed to present visual content. Display assembly 104 can be mounted on side wall retainer 102. In some embodiments, display assembly 104 can includes a touch sensitive layer designed to receive touch inputs from users and generate commands, in accordance with the touch inputs, to a processor circuit (not shown) of portable electronic device 100. A front wall 106 can overlie and cover display assembly 104. In some cases, front wall 106 can cover the entire front surface of portable electronic device 100 and can cooperate with side wall retainer 102 to form a part of an enclosure of portable electronic device 100. Front wall 106 can be formed from a transparent material, such as glass or sapphire including sapphire glass, so that the visual content of display assembly 104 is visible through front wall 106. Hence, front wall 106 can sometimes also be referred to as front cover glass 106, even though front cover glass 106 can be formed from other transparent material. In some embodiments, portable electronic device 100 can also include a force detection sensor (not shown) designed to detect an amount of force applied to display assembly 104 and/or front cover glass 106. The amount of force detected may be received by a processor circuit of portable electronic device 100, in order to generate a command or input based on the amount of force.

Figure 1B:
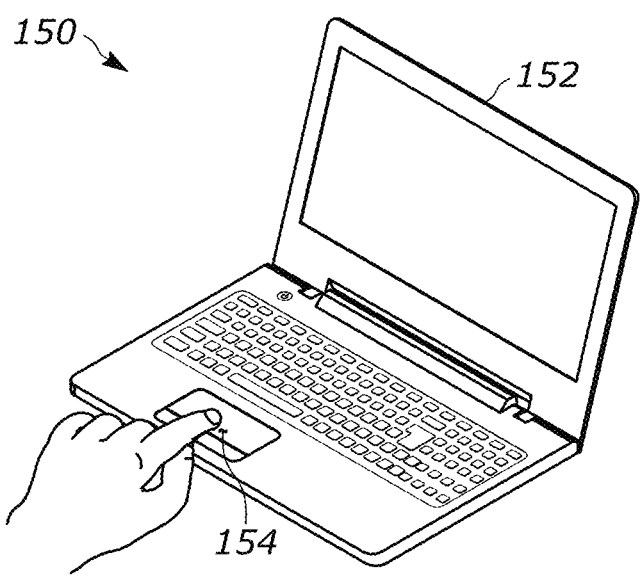
FIG. 1B discloses an electronic device incorporating a user input surface and a haptic output system.

FIG. 1B depicts the electronic device 150 including a housing 152 and a user input surface 154. The user input surface 154 may be associated with, and operated relative to, a haptic output system (not shown). The haptic output system may be positioned above, integrated with, positioned below, or positioned along the periphery of the user input surface 154, although in typical embodiments, the haptic output system is subjacent the user input surface.

The housing 152 can form an outer surface or partial outer surface and protective case for the internal components of the electronic device 150, including the haptic output system. In the illustrated embodiment, the housing 152 is formed in a substantially rectangular shape, although this is not required. The housing 152 can be formed of one or more components operably connected together, such as a front piece and a back piece or a top clamshell and a bottom clamshell. Alternatively, the housing 152 can be formed of a single piece (e.g., uniform body). The housing 152 may be planar, or may be partially or entirely curved. In many embodiments the housing 152 is rigid, although this may not be required; in one embodiment the housing 152 is configured to bend or flex in an elastic manner.

The user input surface 154 may be integrated with one or more touch sensors and/or force sensors that are configured to detect various combinations of user touch and force input to the user input surface 154. The touch and/or force sensors associated with the user input surface 154 may be configured to detect the location of a touch, a magnitude and/or direction of force exerted, and/or a movement of the touch on the user input surface 154.

The touch and/or force sensors associated with the user input surface 154 may be used separately or in combination to interpret a broad range of user inputs such as, but not limited to, touch-based gestures, force-based gestures, touch patterns, tap pattern, single-finger gestures, multi-finger gestures, multi-force gestures, and so on.

The touch and/or force sensors associated with the user input surface 154 may be implemented in any number of suitable ways with any suitable technology or combination of technologies including, but not limited to, self-capacitance touch sensing, mutual capacitance touch sensing, resistive touch sensing, optical touch sensing, acoustic touch sensing, capacitive force sensing, strain-based force sensing, optical force sensing, acoustic force sensing, and so on, or any combination thereof. The touch and/or force sensors may be independently or mutually addressable and may be distributed and/or segmented across the user input surface 154. In other embodiments, the touch and/or force sensors may be disposed relative to a perimeter of the user input surface 154.

Figure 2:
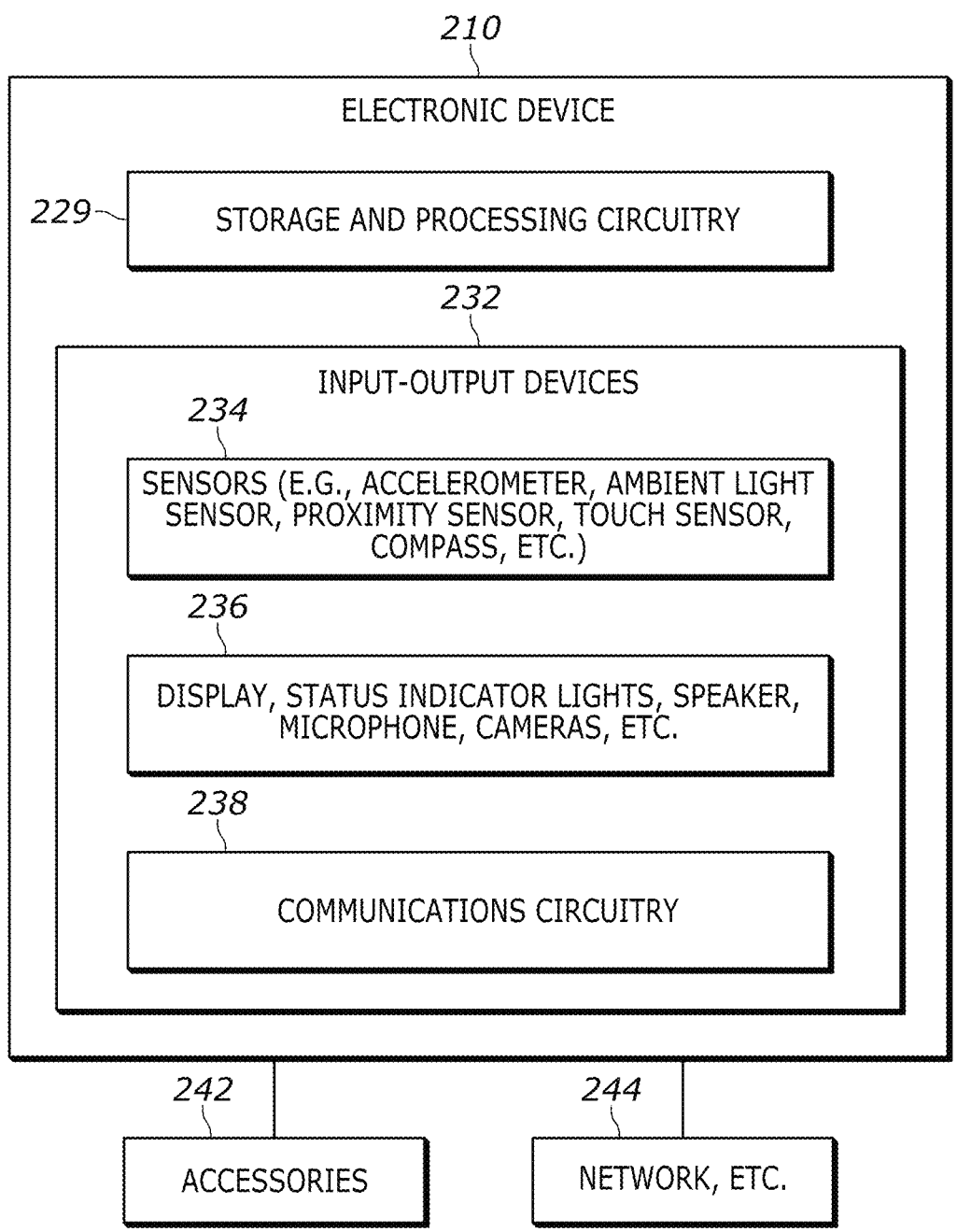
FIG. 2 disclose schematic diagram showing illustrative circuitry that may be included in a device.

A schematic diagram showing illustrative circuitry that may be included in device 210 is shown in FIG. 2. As shown in FIG. 2, electronic device 210 may include control circuitry such as storage and processing circuitry 229. Storage and processing circuitry 229 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 229 may be used to control the operation of device 210. The processing circuitry may be based on one or more microprocessors, microcontrollers, digital signal processors, baseband processors, power management units, audio codec chips, application specific integrated circuits, etc.

Input-output devices 232 may include sensors such as sensors 234. Sensors 234 may include sensors such as ambient light sensors, touch sensors, accelerometers, and proximity, sensors, touch screen sensor arrays (e.g., capacitive touch sensors, touch sensors based on resistive touch sensor technology, acoustic touch technology, light-based touch technology, or other touch sensors), and other sensors.

Input-output devices may also include devices 236 such as audio input-output devices (e.g., microphones and speakers), device such as buttons, joysticks, click wheels, scrolling wheels, touch pads, key pads, keyboards, tone generators, vibrators, cameras, status indicators such as light-emitting diodes, etc. Devices 236 may also include one or more displays such as display 104 of FIG. 1.

Communications circuitry 238 may include wired data port circuitry and wireless communications circuitry. The wireless communications circuitry may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Electronic device 210 may interact with external equipment. For example, electronic device 210 may send data to external equipment 244 and may receive data from external equipment 244. External equipment 244 may include a wireless local area network that communicates wirelessly with device 10 using communications circuitry 38 in device 10, may be wired network equipment to which device 210 is attached with a cable, may be a peer device that is coupled to device 210 through a wired or wireless connection, or may be other equipment that sends and/or receives signals from device 210.

Electronic device 210 may also interact with equipment such as accessories 242 using a wired path and/or wireless path. For example, accessories 242 may include a headset with an audio plug that is configured to mate with an audio jack in device 210. Accessories 242 may also include microphones, speakers, and other audio accessories, video accessories, televisions, computer monitors, charging stations, display equipment, embedded system equipment such as equipment in an automobile, and other external electronic equipment. Analog and/or digital communications may be used in communicating between device 210 and accessories 242.

Device 210 may use software for implementing functions that display information on display 212 and other device functions. The software may be implemented on control circuitry such as storage and processing circuitry 229 of FIG. 2.

The disclosure of the various embodiments may include a two-part method. The first method (or system/apparatus) may involve the determination of the sensor responses (Si) of the mobile phone as a function of one or more finger pressing forces (Ff) and their positions on the screen (xj,yj). Thus, the phone touch screen area may have a position defined by an x and y coordinate that may help predict the position of the finger in response to a sensor response or force applied to the screen.

Figure 3A:
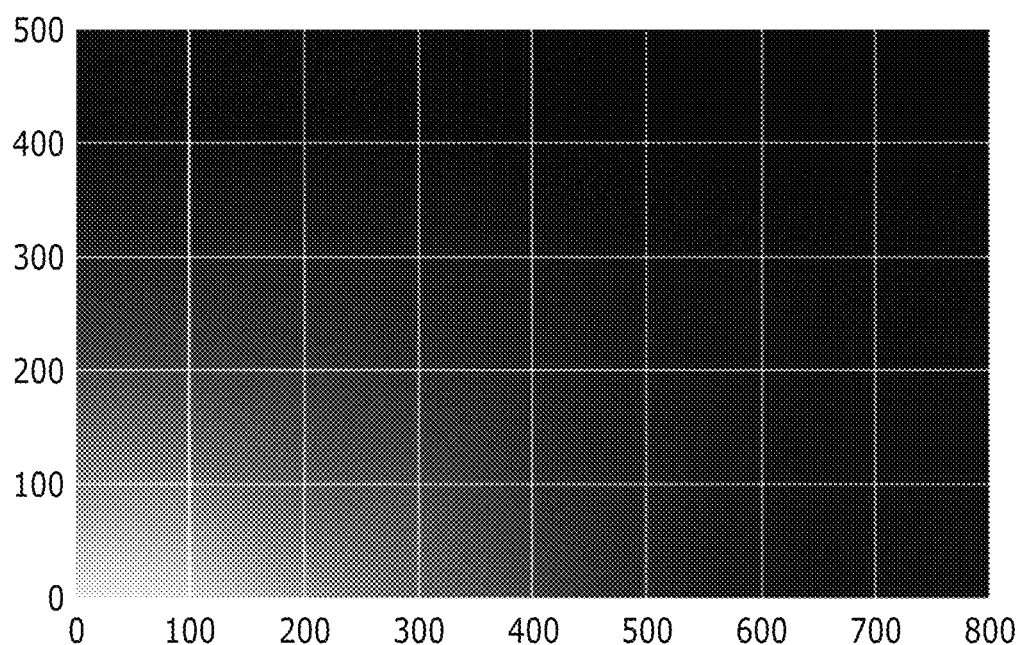
FIG. 3A discloses an illustrative chart of a sensor response.
Figure 3B:
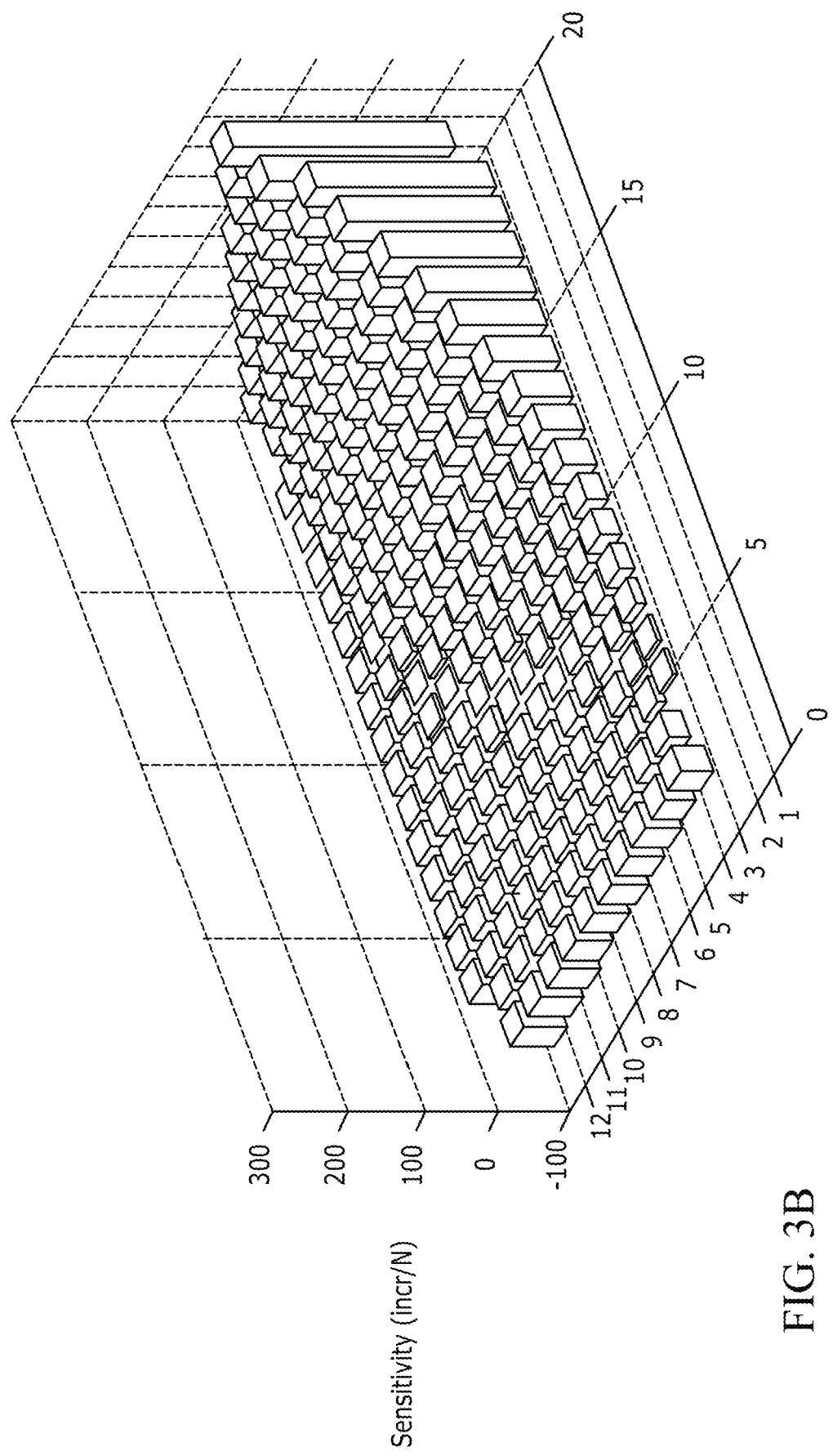
FIG. 3B disclose a three-dimensional illustrative chart of a sensor response.

FIG. 3A shows an illustrative chart of a sensor response. FIG. 3B disclose a three-dimensional illustrative chart of a sensor response. For FIG. 3A, the sensor response may be that of a sensor located at the bottom left corner of a screen for a given location of a finger force. In the example of FIG. 3B, the sensor is located on the bottom right. The closer a finger is to the sensor, the stronger the signal, which may be shown by the lighter (whiteish) coloring of the chart, as opposed to the dark areas. The decrease of the response with distance would be directly proportional to the force for a perfectly rigid screen with a single point of contact surface between the sensor and the screen. In practice, the shape of the contact surface, as well as the flexibility of the screen, make the relationship between the sensor response and the distance non-linear.

Figure 4:
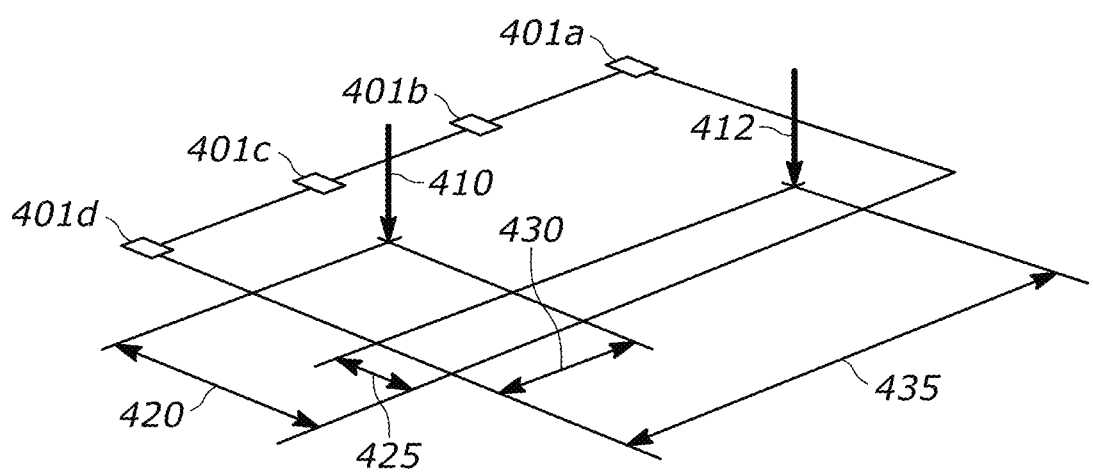
FIG. 4 illustrates an embodiment of four sensors with two fingers applying force on a screen.

FIG. 4 shows an example embodiment with four sensors and two fingers applying force on a screen. The four sensors may be identified as sensors 401a, 401b, 401c, and 401d. In the present embodiment, single finger presses at different locations and different forces 410, 412 may be utilized to learn such a mapping, e.g., Si=Si(Fj, xj, yj). The mapping for a force 410, for example, may identify a x-position 420 and a y-position 430 with respect to a sensor response. In another example, the mapping for a force 412 may identify an x-position 425 and a y-position 435. As an example embodiment, consider FIG. 4, where the system may determine the spatial dependence of a sensor response to single finger forces at any potential location of the screen. In this example embodiment, the system may utilize an optimal sampling strategy known as a Latin Hypercube to more efficiently cover the space of possibilities. Latin hypercube sampling (LHS) may be a statistical method for generating a near-random sample of parameter values from a multidimensional distribution.

Once the mapping Si=Si(Fj, xj, yj) has been established for a single finger, finger j, the second step may be to simulate multi-finger presses. The simplest approach is to consider fingers as being completely independent, but spatial covariance can be incorporated by modelling a limited amount of multi-finger presses as well. As an example, for the simplest possible case (where finger presses are independent), for sensor i and M pressing fingers, we would have the relationship:

$$Si=Si(F1,x1,y1)+Si(F2,x2,y2)+\ldots+Si(FM,xM,yM)$$

By combining the simulated data from a large number of finger positions, the system and method may be left with a table with the variables:

$$S1,S2,S3,\ldots,SN,F1,X1,Y1,F2,X2,Y2,\ldots,FM,XM,YM$$

Then, the system can frame the problem of predicting the finger force as a multi-output regression. Depending on the properties of the screen, the location of the finger press can be determined by a change in conductivity of the screen, simplifying the number of variables that need to be predicted. In this simpler case, the inputs are the responses and finger positions and the outputs are the finger forces. Then, the system may estimate the force model as follows:

$$\vec{F}=F(\vec{S},\vec{x})$$

In the more general case, where one the screen does not provide direct information regarding the location of the finger press, the locations of the fingers may need to be predicted by the model as well. Mathematically, the system may need to determine the following relationship:

$$(\vec{F},\vec{x})=F(\vec{S})$$

The system and method may utilize a machine learning technique to help determine the relationship. For example, multi-output regression is a standard machine learning/statistics technique for which many algorithms exist, including Linear Regression, Decision Trees, Neural Networks, Random Forests, etc. Given the Bayesian nature of most machine learning models, the prediction can be improved with knowledge regarding realistic usage conditions which can be incorporated in the sampling distributions used to generate the simulation.

In addition, when the contact surface of the screen provides some information regarding the location and extent of the finger press, the system can use the temporal variation in the conductivity and surface area as estimators of the force themselves. These additional measures of pressure (or force) can improve the overall accuracy either by being incorporated directly into the model, for example, as:

$$(\vec{F},\vec{x})=F(\vec{S},\vec{T})$$

where T are the set of variables extracted directly from finger contact. Or, the prediction can be a combination of two separate force estimators, one derived from the fixed sensors and one derived from the direct contact sensors. Techniques for combining two sets of prediction abound the statistical literature, with both Bayesian and Frequentist approaches readily available. It may be realized that the particulars of extracting a force prediction from direct surface touch are quite involved.

Once the multi-finger model is created, it may be isolated for that device. Thus, the system may utilize such force data offline to learn single finger force versus a response relationship. The system may then use single finger force x response relationship to produce simulated multi-finger x response relationships. Next, the system may learn (or fit, or parametrize) that relationship using an AI model, e.g. a neural network or other machine learning network. The system may then deploy a model, so that, given a certain sensor response, the system may output a prediction for two items, (1) with what force; and (2) where each finger interacted with the screen. While it is possible that the system may determine where each finger interacted with screen, it is not always necessary given that the location of the fingers that can often be determined electrostatically, e.g., without relying on the force sensors The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electronic device comprising:
   a user input surface configured to receive a user touch location and a user force input; and
   one or more sensors positioned relative to the user input surface and configured to detect a force applied to the user input surface; and
   a controller in communication with the one or more sensors, wherein the controller is configured to:
   detect a first sensor response utilizing a first force applied to the user input surface via the one or more sensors and a first position of the first force applied, wherein the first position is relative to the user input surface and the first sensor response identifies both an x-position and a y-position;
   simulate a multi-finger force being applied by utilizing at least the first sensor response to form simulated multi-finger data; and
   deploy a model associated with the multi-finger force, wherein the model is utilized to output a predicted force and predicted location of an applied force relative to the user input surface.

2. The electronic device of claim 1, wherein the controller is further configured to simulate the multi-finger force utilizing a machine-learning network.

3. The electronic device of claim 1, wherein the controller is further configured to utilize Linear Regression, Decision Trees, Neural Networks, or Random Forests.

4. The electronic device of claim 1, wherein the controller is further configured to determine the first position utilizing at least a conductivity of the electronic device.

5. The electronic device of claim 1, wherein the electronic device includes at least two sensors.

6. The electronic device of claim 1, wherein the controller is configured to model one or more multi-finger presses associated with the user input surface.

7. The electronic device of claim 1, wherein the electronic device includes a vehicle multimedia system, a mobile device, or a notebook.

8. An electronic device comprising:
   a controller in communication with one or more sensors positioned relative to a user input surface and configured to detect a force applied to the user input surface via a user touch location and a user force input, wherein the controller is configured to:
   detect a first sensor response in response to a first force being applied to the user input surface via the one or more sensors, wherein the first sensor response identifies both an x-position and a y-position;
   simulate a multi-finger force being applied by utilizing at least the first sensor response to form simulated multi-finger data; and
   deploy a model associated with the multi-finger force, wherein the model is utilized to output a predicted force and predicted location of an applied force relative to the user input surface.

9. The electronic device of claim 8, wherein the controller is configured to simulate the multi-finger force utilizing a machine learning network.

10. The electronic device of claim 8, wherein the first sensor response indicates a y-coordinate response relationship associated with the first force.

11. The electronic device of claim 8, wherein the first sensor response indicates a y-coordinate response relationship and an x-coordinate response relationship associated with the first force.

12. The electronic device of claim 8, wherein the controller is further configured to utilize Linear Regression, Decision Trees, Neural Networks, or Random Forests to simulate the multi-finger force.

13. The electronic device of claim 8, wherein the controller is configured to model one or more multi-finger presses associated with the user input surface.

14. A method for predicting multi-finger force in a touch screen, comprising:
- receiving a user touch location and a user force input via a user input surface;
- detecting a first force applied to the user input surface utilizing one or more sensors positioned relative to the user input surface;
- detecting a first sensor response utilizing the first force applied to the user input surface via the one or more sensors;
- simulating a multi-finger force being applied by utilizing at least the first sensor response to form simulated multi-finger data, wherein the first sensor response identifies both an x-position and a y-position; and
- deploying a model associated with the multi-finger force, wherein the model is utilized to output a predicted force response associated with a predicted force and predicted location of a future applied force to the user input surface.

15. The method of claim 14, wherein the touch screen is utilized in a vehicle multimedia system, a mobile device, or a notebook.

16. The method of claim 14, wherein the first sensor response is an electrical current responsive to a finger press against a screen of a user interface.

17. The method of claim 14, wherein the method includes a step of utilizing a machine learning network to simulate the multi-finger force.

18. The method of claim 17, wherein the machine learning network is a neural network.

19. The method of claim 14, wherein the method includes the step of modelling a multi-finger press.

20. The method of claim 14, wherein the method includes a step of utilizing both a machine learning network and a second sensor response to simulate the multi-finger force.

* * * * *